(12) United States Patent
Bambridge et al.

(10) Patent No.: US 6,259,933 B1
(45) Date of Patent: Jul. 10, 2001

(54) INTEGRATED RADIO AND DIRECTIONAL ANTENNA SYSTEM

(75) Inventors: Timothy Brooks Bambridge, Randolph; Peretz Moshes Feder, Englewood; Haim Shalom Ner, Fair Lawn, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/119,438

(22) Filed: Jul. 20, 1998

(51) Int. Cl.[7] .................................................. H04B 1/00
(52) U.S. Cl. .......................... 455/557; 455/90; 455/348; 455/349; 343/702
(58) Field of Search .................................. 455/557, 558, 455/559, 550, 575, 90, 25, 349, 347, 348; 343/702, 906

(56) References Cited

U.S. PATENT DOCUMENTS

| 5,438,697 | * | 8/1995 | Fowler et al. | 455/347 |
| 5,913,174 | * | 7/1998 | Casarez et al. | 455/557 |
| 5,914,693 | * | 6/1999 | Takei et al. | 343/767 |
| 5,918,163 | * | 6/1999 | Rossi | 455/90 |

* cited by examiner

Primary Examiner—Lee Nguyen
(74) Attorney, Agent, or Firm—Allen, Dyer, Doppelt, Milbrath & Gilchrist, P.A.

(57) ABSTRACT

An integrated outdoor radio and directional antenna system provides a direct RF connection(s) on the signal path between a directional antenna and radio components to remove the lossy RF cable(s). Direct connections between the various components of the integrated radio and directional antenna system enable reduced cost and ease of manufacture. In certain embodiments, the integrated directional antenna and radio system provides a direct RF connection between the directional antenna and the radio, and a printed wiring board (PWB) -mounted connector provides a direct digital connection between the radio board(s) and a medium access control (MAC) board. An input/output (I/O) interface provides a digital network interface between the MAC unit and indoor processing circuitry. The digital network interface enables packets of digital information to pass between the indoor processing circuitry and the integrated directional antenna and radio system. An external connection is made between the digital network interface and indoor processing circuitry, such as a personal computer or digital network equipment, but the losses associated with such a digital connection are less significant due to the robustness associated with the processing of digital information in a digital packet data form. In other embodiments, the integrated antenna and radio system provides a direct RF connection between the antenna and RF signal circuitry, such as an RF matrix board which accommodates polar diversity for the antenna and includes a duplexer, RF switching for multiple radios, filtering and any other appropriate RF signal circuitry. A direct RF connection also exists between the RF signal circuitry and the radio components. A direct digital connection is provided between the radio board and the MAC board, and the I/O interface provides a digital network interface with the indoor processing circuitry. In yet other embodiments, all or some of the above components described for the integrated directional antenna and radio system are integrated onto a single printed circuit board and are directly connected together and to the directional antenna.

9 Claims, 1 Drawing Sheet

INTEGRATED RADIO AND DIRECTIONAL ANTENNA SYSTEM

BACKGROUND OF THE INVENTION

1. Field of The Invention

This invention relates to wireless communication systems and, more particularly, to an integrated radio and directional antenna system and a method of making same.

2. Description of Related Art

Typically, in fixed outdoor wireless data systems, a radio frequency (RF) connection cable connects an outdoor antenna with an indoor radio. The RF connection cable introduces losses of signal between the antenna and the radio. Active antenna systems solve this problem by amplifying the signal level before the lossy cable, usually a coaxial cable. The active antenna systems require additional circuitry and a power supply line in addition to the RF signal line. As such, there is a cost associated with countering the losses introduced by the RF connection cable between the antenna and the radio.

In some systems, antenna diversity is typically provided by antenna systems where the receiver selects a particular antenna out of a set of antennas. Antenna diversity assists in coping with multipath fading of a received signal whereby the signals received by each antenna are compared, and the antenna having the better reception or the best signal quality (for example, signal-to-noise ratio) as measured by the base transceiver is selected. Typical diversity antenna systems require additional extraneous control lines and circuitry or multiple lossy coax cables which have to be run from the indoor radio or processing circuitry to the outdoor antenna unit. The additional lines and/or circuitry add costs and reduce the modularity of the antenna system.

Thus, a need exists for a system that overcomes the drawbacks of current systems in a cost effective manner.

SUMMARY OF THE INVENTION

The present invention involves an integrated outdoor radio and directional antenna system which provides a direct RF connection(s) on the signal path between a directional antenna and radio components to remove the lossy RF cable(s). Direct connections between the various components of the integrated radio and directional antenna system enable reduced cost and ease of manufacture. In certain embodiments, the integrated directional antenna and radio system provides a direct RF connection between the directional antenna and the radio, and a printed wiring board (PWB) -mounted connector provides a direct digital connection between the radio board(s) and a medium access control (MAC) board. An input/output (I/O) interface provides a digital network interface between the MAC unit and indoor processing circuitry. The digital network interface enables packets of digital information to pass between the indoor processing circuitry and the integrated directional antenna and radio system. An external connection is made between the digital network interface and indoor processing circuitry, such as a personal computer or digital network equipment, but the losses associated with such a digital connection are less significant due to the robustness associated with the processing of digital information in a digital packet data form. In other embodiments, the integrated antenna and radio system provides a direct RF connection between the antenna and RF signal circuitry, such as an RF matrix board which accommodates polar diversity for the antenna and includes a duplexer, RF switching for multiple radios, filtering and any other appropriate RF signal circuitry. A direct RF connection also exists between the RF signal circuitry and the radio components. A direct digital connection is provided between the radio board and the MAC board, and the I/O interface provides a digital network interface with the indoor processing circuitry. In yet other embodiments, all or some of the above components described for the integrated directional antenna and radio system are integrated onto a single printed circuit board and are directly connected together and to the directional antenna.

BRIEF DESCRIPTION OF THE DRAWINGS

Other aspects and advantages of the present invention may become apparent upon reading the following detailed description and upon reference to the drawings in which.

DETAILED DESCRIPTION OF THE DRAWINGS

Figure 1:
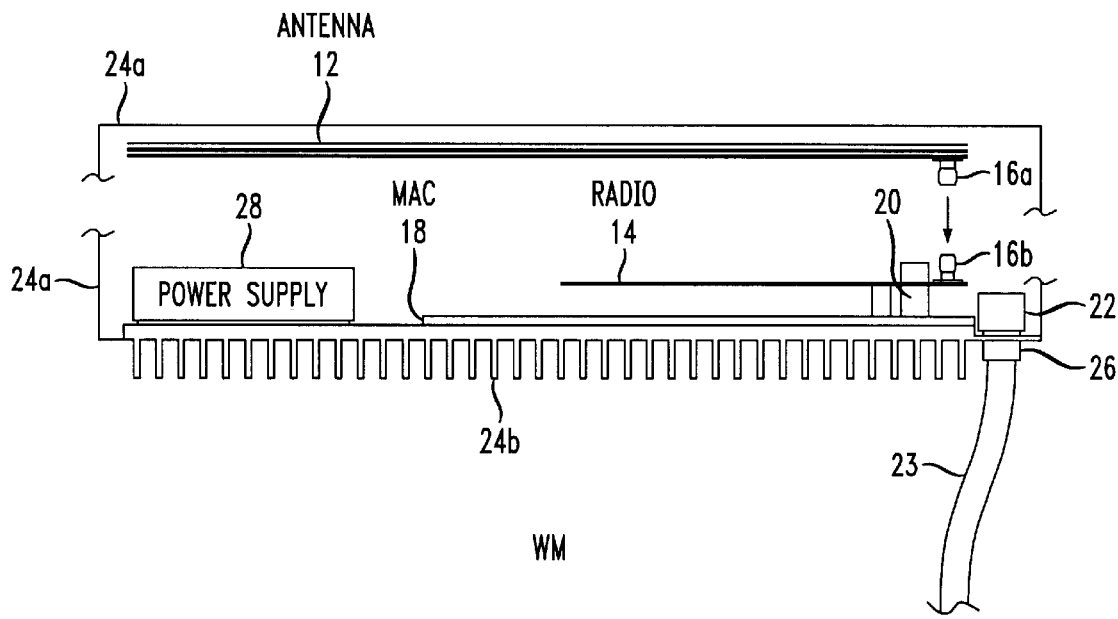
FIG. 1 shows a block diagram of an embodiment of the integrated directional antenna and radio system according to principles of the present invention.

Two illustrative embodiments of the integrated outdoor directional antenna and radio system are described below which integrate directional antenna and RF components with direct connections to reduce the costs associated with using lossy external RF connection cables between the directional antenna and radio and/or RF signal components and also to improve the manufacturing and modularity of the system. FIG. 1 shows one embodiment of a weatherized integrated directional antenna and radio system 10 which could be used as an outdoor wireless modem (WM) connected to a personal computer using a digital network interface, such as T1, E1 or Ethernet, to provide access to a wireless packet data network. The system 10 includes a direct connection between a directional antenna 12 and a radio board 14. The direct connection is provided by a connector 16a on the antenna board 12, and a mating connector 16b on the radio board 14. The connectors 16a–b can be miniature coaxial connectors. By providing a direct connection between the directional antenna 12 and the radio 14, the integrated radio and antenna system eliminates the relatively long external RF connecting cable which connects the separate antenna and RF or radio components of previous systems. Additionally, the direct connection between the antenna 12 and the radio 14 permits easy assembly of the system.

In this embodiment, the antenna board 12 is a directional patch antenna, as described by Jean-Francois Zurcher and Fred E. Gardiol, "Broadband Patch Antennas," Artech House, Inc. (1995), with approximate dimensions of 12" long×12" wide×0.5" tall. In this particular embodiment, the patch antenna 12 includes 16 aluminum patches printed on or displaced from a circuit board characterized by a dielectric constant of 4 in this particular embodiment and an aluminum back shield or reflector. Other types of directional antennas are possible. Additionally, the radio board 14 in this embodiment includes a single frequency division duplex (FDD) radio operating in half-duplex mode (can both transmit and receive but not at the same time in this embodiment). The radio is assembled on a layered circuit board and has approximate dimensions of 5"×5.5". Alternative embodiments could use other duplex techniques.

The integrated directional antenna and radio system 10 of this enbodiment provides a direct digital connection on the signal path between the radio board 14 and a medium access control (MAC) unit 18. In this embodiment, the MAC unit 18 operates in half duplex mode and is assembled on a layered board with dimensions of about 5.5'×7.5". A PWB connector 20, such as a header connector having 2×17 pins, provides the direct connection between the radio board 14 and the MAC unit 18. An I/O interface 22, which can include for example an RJ45 connector, is directly connected to and/or integrated with the MAC unit 18. The I/O interface 22 provides a digital network interface between the outdoor integrated directional antenna and radio system 10 and indoor digital processing equipment. In this embodiment, the digital link connecting the digital interface 22 with the indoor processing equipment, such as a personal computer, (not shown) is a line 23 which passes through a weatherized housing 24 which includes radome 24a and support and/or heat sink sections 24b) via a weathertight cable seal 26. The line 23 is directly connected to the I/O interface 22 within the weatherized housing 24. Other digital links are possible. The integrated system 10 includes a power supply 28 for the system 10 which receives power through the same line 23 as the data from an outside power source. Other systems are possible which provide power and digital information over the same or multiple lines.

Figure 2:
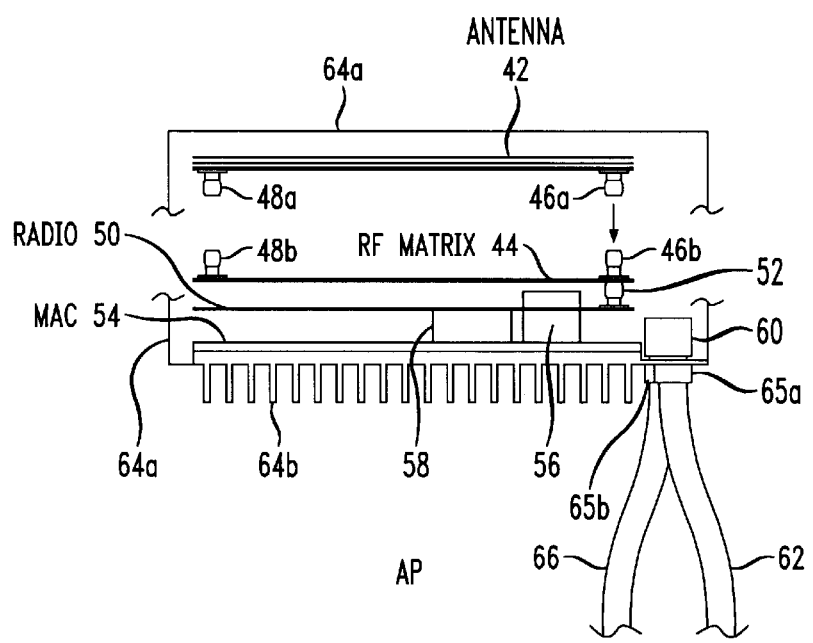
FIG. 2 shows a block diagram of an alternative embodiment of the integrated directional antenna and radio system according to the principles of the present invention.

FIG. 2 shows another embodiment of an integrated directional antenna and radio system 40 with multiple radios which are used as an wireless access point (AP) by the WM to a digital network. The system 40 includes direct connection(s) between an antenna 42 and an RF matrix board 44 on the signal path(s). In this embodiment, the antenna board 42 is a directional patch antenna which provides horizontal polarization (Hp) and vertical polarization (Vp) for polar diversity. In this embodiment, the radio chooses the best polarization based on the received power levels at the two polarizations. Other schemes are possible which perform a ratio combining of the signals received at the two polarizations. This directional patch antenna includes 24 patches printed on or displaced from a circuit board characterized by a dielectric constant of 4 and with approximate dimensions of 5" wide×25" wide×0.5" tall. The patch antenna 42 also includes an aluminum back shield or reflector. Other types of directional antennas are possible. The RF matrix board 44 is designed to accommodate the polar diversity and includes a duplexer (not shown), RF switching to accommodate the multiple radios, and filtering. The approximate dimensions for this particular embodiment are 5"×3". By providing a direct connection between the antenna 42 and the RF matrix 44, the integrated radio and directional antenna system 40 eliminates the relatively long RF connecting cable(s) which connects the separate antenna (s) or poles of the antenna and the RF components.

The direct connections are provided by a first set of connectors 46a–b and a second set of connectors 48a–b. In this embodiment, the connectors 46a–b and 48a–b are miniature coax connectors, and each set of connectors 46a–b and 48a–b respectively provides a direct connection between the RF matrix board 44 and horizontal and vertical polarity terminals on the antenna board 42. The direct RF connection reduces the losses and costs associated with RF connection cabling which connects the outdoor antenna with the indoor radio components. Additionally, the direct connection as well as the connectors being in-line or stacked along one plane between the antenna 42 and the RF matrix 44 or any other board(s) permits easy and stable assembly of the system 40.

The integrated directional antenna and radio system 40 provides a direct RF connection 52 between the RF matrix board 44 and a radio board 50. The direct connection is provided by a connector pair 52 which is a shielded connector pair. In this embodiment, the connector pair 52 is at the edge of the board 44 and 50 and in line with the connectors 46a–b between the antenna board 42 and the RF matrix board 44 for ease of manufacture and stability.

The AP 40 operates in full duplex mode (transmits and receives simultaneously), and in this embodiment uses a frequency division duplex scheme. In this embodiment, the radio board 50 includes two FDD radios operating in half-duplex mode with one radio transmitting and the other radio receiving. The radios are assembled on layered boards which have approximate dimensions of 5"×5.5".

The integrated directional antenna and radio system 40 provides a direct digital connection between the radio board 50 and a medium access control (MAC) board 54. In this embodiment, the MAC board 54 includes two MAC units each operating in half-duplex mode, one supporting outbound digital packets and the other supporting inbound digital packets. A MAC converts digital information from the radio board 50 into digital packets suitable for communication with the network protocol used by the indoor processing equipment, such as Ethernet. Digital packets received from the I/O interface are converted into a digital form suitable for wireless communications. The MAC units are assembled on a layered board with approximate dimensions of 5.5"×7.5". PWB connectors 56 and 58, such as 2×17 header connectors, directly connect the radio board 50 and the MAC board 54. More specifically, one header connector 56 directly connects one radio to a corresponding MAC unit, and the second header connector 58 directly connects the second radio to the corresponding second MAC unit. In this embodiment, the only anticipated cable is a 15-pin D-type connection (not shown) between the two MAC units for providing handshaking and/or control signals.

An I/O interface 60, including for example an RJ45 connector, is directly connected to and/or integrated with the MAC board 50. The I/O interface 60 provides a digital network interface between the outdoor integrated directional antenna and radio system 40 and indoor digital processing equipment. In this embodiment, the digital network link connecting the digital interface 60 with the indoor processing equipment, such as digital network equipment (not shown) is provided by a line 62 which passes through a weather-tight housing 64 (which includes radome 64a and support and/or heat sink sections 64b) via a weather-tight cable seal 65a. The line 62 is directly connected to the I/O interface 60 within the weatherized housing 64 and the line passes through the weatherized housing 64. The I/O interface terminates the intput and outputs of the MAC board 54 to provide the digital interface with the indoor digital network equipment. Other digital links and/or interfaces are possible. The integrated system 40 includes a power supply (not shown) for the system 40 which receives a cable 66 from an outside power source (not shown) through another weatherized cable seal 65b. Other systems are possible which provide power and digital information over the same line.

Thus, by providing direct connections from the antenna to the digital network through a single integrated outdoor unit, the integrated directional antenna and radio system improves performance and reduces costs as well as providing a modular system which is easy to assemble and/or manufacture. The losses associated with the external lines running from the outdoor integrated antenna and radio system to the indoor processing circuitry, such as digital network equipment and/or a computer is not a problem due to the robustness associated with processing packets of digital network data.

Alternative configurations of the integrated antenna and radio system are possible which omit or add components or use different components. For example, the number of radios on a radio board or the number of radio boards could be changed. Alternatively, various boards could be combined. For example, the RF matrix or other RF processing, switching or filtering circuitry could be placed on the radio board. Moreover, all the components could be integrated on one board, and the one board be directly connected to the directional antenna. As such, although the integrated antenna and radio system has been described as being comprised of several boards of distinct components, it should be understood that portions of the described system can be employed using application specific integrated circuits, software driven processing circuitry, or other arrangements of circuitry to combine the functionality described above into one board or different types of boards than described. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. An integrated outdoor wireless communication system, said system comprising:

a housing;

a directional antenna mounted within said housing and having a radio frequency (RF) connector; and a radio board mounted within said housing and having at least one radio and an RF connector which couples with said RF connector for said directional antenna to directly connect said directional antenna to said radio board;

a medium access controller (MAC) mounted within said housing and connected to said radio; and a digital interface directly connected to said MAC and providing at least one terminal through which packets of digital data pass.

2. The system of claim 1 further comprising:

a MAC board mounted within said housing and mounting said MAC and a connector which couples to a connector on said radio board to directly connect said radio to said MAC.

3. The system of claim 1 further comprising:

indoor processing circuitry connected to said at least one terminal which receives or sends said packets of digital data.

4. The system of claim 1 wherein said board further including RF matrix circuitry.

5. The system of claim 4 wherein said board further including at least one medium access controller coupled to said at least one radio.

6. The system of claim 5 wherein said board further including a digital interface coupled to said at least one MAC and providing at least one terminal through which packets of digital data pass.

7. An outdoor communication system, said system comprising:

a housing;

a directional antenna board mounted within said housing and having a radio frequency (RE) connector; and a radio matrix mounted within said housing and having a RE connector which couples to said RE connector for said directional antenna board;

a radio board mounted within said housing and having at least one radio and an RE connector which couples with a second RE connector from said radio matrix to directly connect said at least one radio to said radio matrix;

a medium access controller (MAC) mounted within said housing and connected to said radio; and a digital interface directly connected to said MAC and providing at least one terminal through which packets of digital data pass.

8. The system of claim 7 further comprising:

MAC board mounted within said housing and mounting said MAC and a connector which couples to a connector on said radio board to directly connect said at least one radio matrix to said MAC.

9. The system of claim 7 further comprising:

indoor processing circuitry connected to said at least one terminal which receives or sends said packets of digital data.

* * * * *

UNITED STATES PATENT AND TRADEMARK OFFICE
CERTIFICATE OF CORRECTION

PATENT NO.   : 6,259,933 B1  
DATED        : July 10, 2001  
INVENTOR(S)  : Bambridge et al.

Page 1 of 1

It is certified that error appears in the above-identified patent and that said Letters Patent is hereby corrected as shown below:

Title page,
Item [57], ABSTRACT, delete the present Abstract and substitute the following Abstract:
-- An integrated outdoor wireless communication system includes a housing and a directional antenna mounted within the housing and having a radio frequency (RF) connector. A radio board is mounted within the housing and has at least one radio and an RF connector which couples with the RF connector for the directional antenna to directly connect the directional antenna to the radio board. A medium access controller (MAC) is mounted within the housing and connected to the radio. A digital interface is directly connected to the MAC and provides at least one terminal through which packets of digital data pass. --

Column 6,
Claim 7, delete all references to "RE" substitute -- RF --

Signed and Sealed this

Eleventh Day of December, 2001

Attest:

NICHOLAS P. GODICI  
Attesting Officer   Acting Director of the United States Patent and Trademark Office